United States Patent Office

3,664,758
Patented May 23, 1972

3,664,758
AXIAL THRUST BALANCING MECHANISM FOR MOTOR DRIVEN PUMP
Ryuichi Sato, Tokyo, Japan, assignor to Nikkiso Co., Ltd., Tokyo, Japan
Filed Dec. 15, 1970, Ser. No. 98,281
Claims priority, application Japan, Aug. 6, 1970, 45/68,527
Int. Cl. F04d 29/66, 13/02
U.S. Cl. 415—104          8 Claims

ABSTRACT OF THE DISCLOSURE

An axial thrust balancing mechanism for motor pump wherein two thrust bearings of the material which permit a certain degree of abrasion are symmetrically arranged and secured to an interior of a pump casing so as to encompass each end of motor rotor shaft through two symmetrically arranged thrust washers mounted on the motor rotor shaft between the motor rotor and the thrust bearing with a certain clearance. An auxiliary thrust bearing of the material which permits a certain degree of abrasion is releasably fixed to one side wall of the end plate forming a variable orifice provided before and/or behind the impeller.

BACKGROUND OF THE INVENTION

This invention relates to an improved arrangement for reducing or eliminating an axial thrust on a shaft of an external motor driven pump or a canned motor driven centrifugal pump.

Generally in the external motor driven pump and the canned motor driven centrifugal pump, a motor rotor chamber and an impeller chamber are divided by an end plate. In the impeller chamber of this type, there has been often used a hydraulic thrust balance mechanism wherein a fixed orifice and a variable orifice are arranged between the impeller and an end plate to provide a pressure balancing chamber therebetween so that the variable orifice is contracted while increasing a pressure in the pressure balancing chamber to depress the impeller thereby preventing undesirable contact of the impeller with the end plate and positioning the impeller in its normal location with a proper balance of the axial thrust.

However, in the balancing mechanism of the aforesaid type a gapping space which permits an effective actuation of the pressure balancing chamber is very small such as less than from 0.02 mm. to 0.1 mm.

Accordingly, when a motor shaft is distorted or biased due to some influences such as load of the pipe arrangement applied to the casing, deformation of the impeller by thermal distortion, irregular assembly of the pump or abrasion of the bearing and the like, the end plate is forced into contact with the impeller on one side while the orifice is opened to a magnitude more than the gapping space which permits an effective operation of the pressure balancing chamber on the other side, whereby an actuation of the pressure balancing chamber is deenergized with a frictional contact between the end plate and the impeller following abrasion of both members.

A further abrasion of both members makes the wall surface of the end plate and the impeller surface forming an orifice coarse in their area of adjacency and therefore even when the gapping space of the orifice comes back to its normal distance, an effective throttling action of the orifice cannot be attained due to the ceasing of the operation of the pressure balancing chamber.

More particularly, on starting or stopping of the operation or on generation of hanching or cabitation of a control valve connected to the pump, the hydraulic balance mechanism will be destroyed.

In order to prevent the apparatus from suffering any damage caused when the hydraulic balance mechanism does not operate, the motor shaft is usually associated with an ordinary thrust bearing while the thrust washer to be contacted with the thrust bearing is secured to the rotary shaft.

Further, it is difficult to sufficiently minimize the thrust load developed by the rotation of the impeller of the centrifugal pump for a whole cycle of the operational flow rate of the pump although a certain reduction may be attained in the restricted operational cycle. Moreover, depending on a point of the operation, an excessive load is applied between the thrust bearing and the thrust washer following a considerable increase of abrasion of the thrust bearing.

In order to decrease the load per unit area between the thrust bearing and the thrust washer, a bearing of large diameter is inevitably used. In that case, the load per unit area is decreased while the circumferential velocity is increased. In consequence, for the bearing especially for use in the canned motor pump such as the carbon bearing having the limited PV value, where P represents an allowable load per unit area and V is an average sliding velocity, a decrease of P results in increase of velocity V so that a total load volume of the shaft is not increased without diminishing the abrasion of the thrust bearing.

In view of the above, it would seem logical to utilize a combination of the thrust bearing with the thrust washer and the hydraulic thrust balance mechanism of the impeller for balancing the axial thrust in consideration of the pump stability. In that case, however, a working error along the axial direction would be accumulated and, accordingly the gapping space of the variable orifice becomes too large to actuate the hydraulic thrust balance mechanism although the thrust washer is in contacting relation with the thrust bearing, whereby the balance mechanism becomes ineffective.

On the contrary, in case the thrust bearing and the thrust washer are not in a contiguous relation even without gapping space of the variable orifice, it is difficult to prevent the variable orifice from suffering damage occurable due to the defect of the hydraulic thrust balance mechanism as hereinbefore described.

After intensive studies, it has been discovered that the above antinomic shortcomings may be overcome simultaneously by provision of double thrust bearings system.

In the balancing arrangement of the axial thrust wherein a combination of the thrust bearing with the thrust washer and the hydraulic thrust balance mechanism are utilized, the thrust bearings are composed of material which positively permits a certain degree of abrasion, and one wall surface of the end plate forming a variable orifice of the hydraulic thrust balance mechanism is constructed as an auxiliary thrust bearing of the material which permits a certain degree of abrasion just like the thrust bearings while an opposite wall surface of the impeller is subjected to metallic surface treatment. Thus, when the thrust bearing and the thrust washer are in contiguous relation with the large gapping clearance of the variable orifice of the hydraulic thrust balance mechanism, the abrasion of the thrust bearing develops in a proper degree with a gradual reduction of the clearance of the variable orifice thereby actuating the hydraulic thrust balance mechanism effectively. Further, when no clearance of the variable orifice of the hydraulic thrust balance mechanism resides with a certain gapping space between the thrust bearing and the thrust washer, an auxiliary thrust bearing forming one wall surface of the variable orifice is forced into contact with the wall surface of the impeller which is subjected to the surface treatment to facilitate a smooth abrasion of the auxiliary thrust so that the hydraulic thrust balance mechanism is always effective. A proper progress of abrasion of the auxiliary thrust bearing results in contact of the thrust bearing with the thrust washer, so that an excessive thrust may be suppressed by the thrust bearing as well as the thrust washer with the best balancing effect of the axial thrust.

SUMMARY OF THE INVENTION

It is, therefore, a general object of the invention to provide an arrangement for a motor driven pump having improved structure for balancing an axial thrust on the shaft which is simple in construction and suitable for mass production.

A principal object of the present invention is to provide an axial thrust balancing mechanism for motor pumps comprising a motor section and an impeller section divided by an end plate with a fixed orifice, a variable orifice and a pressure balancing chamber provided between the end plate and the impeller for effecting hydraulic thrust balance of the impeller, characterized by comprising two symmetrically arranged thrust bearings of a material which permits a certain degree of abrasion and being secured to an interior of a pump casing so as to encompass each end of a motor rotor shaft, two symmetrically arranged thrust washers mounted on the motor rotor shaft between the motor rotor and the thrust bearing with a certain clearance, and an auxiliary thrust bearing of the material which permits a certain degree of abrasion and releasably fixed to one side wall of the end plate forming a variable orifice provided before and/or behind the impeller.

The other objects and advantageous features of the invention will be more readily understood from the following description taken in connection with the accompanying drawings forming part thereof, in which:

DESCRIPTION OF THE PREFERRED EMBODIMENTS

It should, of course, be understood that the description and drawings herein are illustrative only, and that various modifications and changes can be made in the structure disclosed without departing from the spirit of the invention.

Like numerals refer to like parts throughout the several views.

Figure 1:
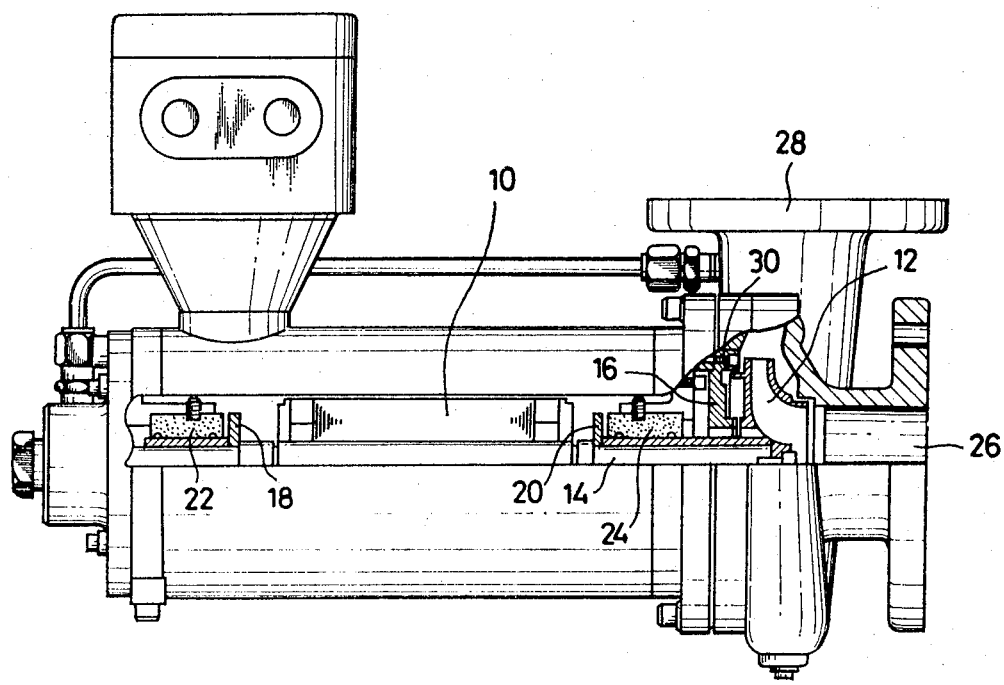
FIG. 1 is a front elevation view, partially sectioned, of the pump accommodating thrust balancing arrangements in accordance with the invention.
Figure 2:
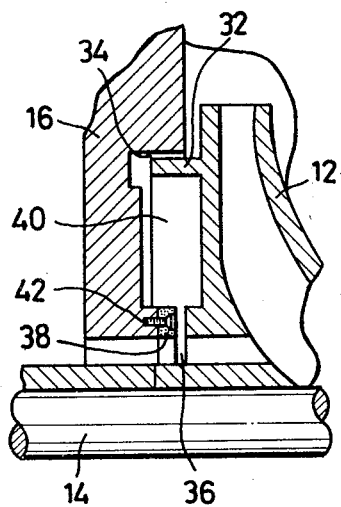
FIG. 2 is a fragmentarily enlarged sectional view of an axial-thrust balancing means in accordance with the invention.

In FIGS. 1 and 2 of the accompanying drawings, a motor rotor 10 and an impeller 12 are connected together through a common motor shaft 14 and accommodated in a pump housing separated relation by an end plate 16.

The motor rotor shaft 14 at each end portion thereof in abutment with each end face of the motor rotor 10 is provided with thrust washers 18, 20 and thrust bearings 22, 24 secured to an interior of the pump housing so as to encompass the motor shaft 14 with a certain clearance apart from the thrust washers 18, 20.

The thrust bearing is composed of a material which permits a certain degree of abrasion such as carbon graphite, Teflon, carbon ceramic or copper alloy and the like. On the other hand, the thrust washer can advantageously be of steel plate subjected to surface treatment such as metallizing plating or grinding of the base metal.

In accordance with the foregoing description, when an axial thrust is applied on the motor shaft, the thrust washer 18 is forced into frictional contact with the thrust bearing 22 to suppress an excessive thrust on the left side of the motor rotor shaft 14 whereas the thrust washer 20 is forced into a frictional contact with the thrust bearing 24 to suppress an excessive thrust on the right side of the shaft 14.

The motor rotor shaft 14 at its one terminal portion is secured with an impeller 12 for suction of the fluid through an inlet connection 26 and delivery of the same fluid through a diffuser or delivery connection 28.

The end plate 16 at its wall surface facing the impeller 12 is provided with an annular recess 30 encompassing the motor shaft 14. On the other hand, the impeller 12 at its rear side portion in symmetrical relation to the annular recess 30 is provided with an annular projecting rim 32 with a certain clearance from the recess 30 thereby to provide a fixed orifice 34.

In the vicinity of the motor shaft 14 a variable orifice 36 is provided between the impeller 12 and the end plate 16 which at its lower rim portion forming the variable orifice is releasably provided with an annular thrust bearing 38 of a material which permits a certain degree of abrasion like the thrust bearings 22 and 24 by means of a fastener such as a stud 42 as best shown in FIG. 2.

Thus, between the fixed orifice 34 and the variable orifice 36, there is provided a pressure balancing chamber 40 for enabling an automatic balance of the axial thrust of the impeller 12. On starting or stopping of the operation or an extraordinary operation due to a certain external influence, the variable orifice 36 is closed due to the contiguous relation of the adjacent wall surfaces thereby to serve as an auxiliary thrust bearing for the thrust bearing 22. One of the wall surfaces of the impeller forming the variable orifice can advantageously be subjected to a metallic surface treatment to facilitate smooth abrasion of the bearing member when the variable orifice 36 serves as an auxiliary thrust bearing so that a hydraulic thrust balance performance by the fixed orifice 34 and the variable orifice 36 is always held in effect during an ordinary driving operation.

The thrust bearing 38 which has been worn out owing to an extended period of use or an excessive driving operation may be readily removed for replacement with a fresh unit and similarly the worn out thrust bearings 22 and 24 may be replaced to accomplish a constant and stabilized thrust balancing of the shaft.

Figure 3:
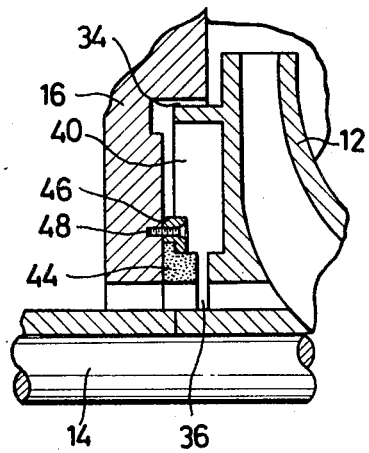
FIGS. 3 to 8 are fragmentarily enlarged sectional views of other embodiments of the axial thrust balancing means of FIG. 2.
Figure 4:
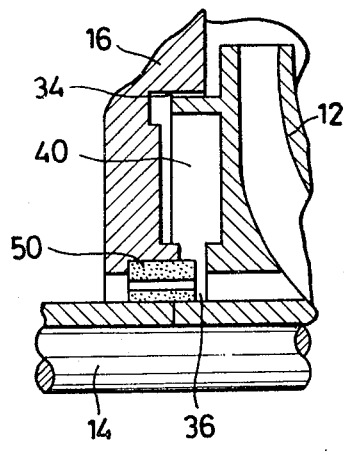

As best shown in FIG. 3, an auxiliary thrust bearing 44 of L shape may be secured to a lower portion of the end plate 16 through a metal ring 46 by means of a stud 48 in such a manner as to provide a rim forming one side wall of the variable orifice 36. Moreover, an auxiliary thrust bearing 50 of rectangular form may be arranged along the motor rotor shaft 14 to serve as a journal bearing of the shaft 14, as best shown in FIG. 4.

Figure 5:
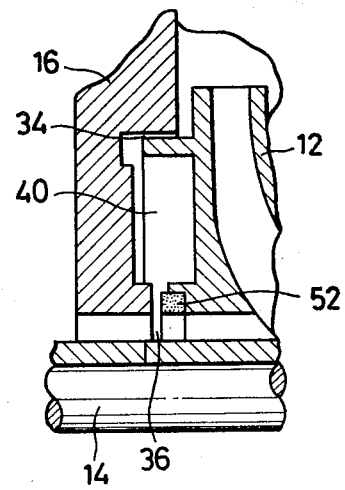

Further, an auxiliary thrust bearing 52 may be releasably attached to the side wall surface beneath the lower rim of the impeller 12 to form one side wall of the variable orifice as best shown in FIG. 5.

Figures 6, 7:
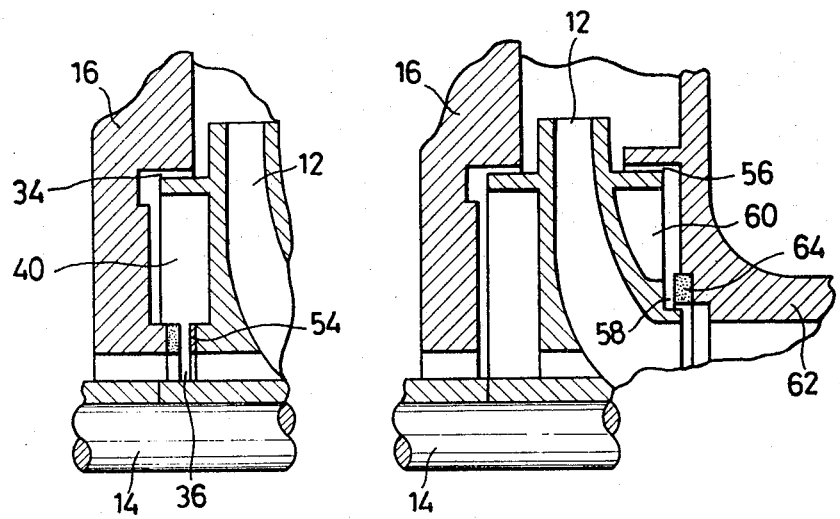

In each one of the above embodiments, the wall surface of the impeller facing to the auxiliary thrust bearing forming the variable orifice is subjected to a metallic surface treatment or releasably provided with a thrust ring 54 which has been subjected to a surface treatment as best shown in FIG. 6 to impel a smooth abrasion of the auxiliary bearing.

A further hydraulic thrust balance mechanism can be provided between the impeller 12 and the pump casing. As best shown in FIG. 7, a fixed orifice 56, a variable orifice 58 and a pressure chamber 60 are provided between the impeller 12 and the casing 62 forming a suction inlet connection 26, and an auxiliary thrust bearing 64 is releasably secured to the side wall of the casing 62 forming the variable orifice 58.

Figure 8:
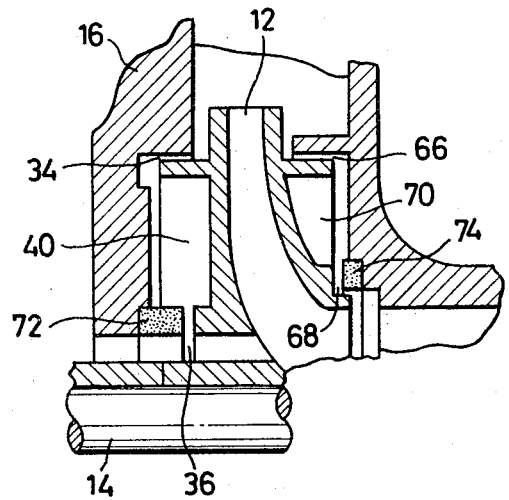

In FIG. 8, a fixed orifice 34, a variable orifice 36 and a pressure chamber 40 are formed at the rear side of the impeller, and a fixed orifice 66, a variable orifice 68 and a pressure chamber 70 are provided at the front of the impeller 12. The wall surfaces forming the variable orifice 36 and 68 are releasably provided with auxiliary thrust bearings 72 and 74 for balancing the hydraulic thrust more effectively.

As illustrated above in accordance with the invention, the thrust bearings and the auxiliary bearing to be attached to one wall surface of the variable orifice are all composed of a material which permits positively a certain degree of abrasion thereby to balance a hydraulic thrust while preventing the pump components from suffering damage. The worn out bearings may be readily replaced by simple operation.

Moreover, errors in dimension of the bearing do not adversely affect the operation of the pump and such errors will be rectified due to a proper abrasion of the bearings during the operation of the pump since the bearings permit positively a certain degree of abrasion. This is suitable for mass production of the pump.

While certain preferred embodiments of the invention have been illustrated by way of example in the drawings and particularly described, it will be understood that various modifications may be made in construction and that the invention is no way limited to the embodiments shown.

What I claim is:

1. An axial thrust balancing mechanism for a motor driven pump comprising a pump housing having a suction inlet and a discharge outlet, a rotor shaft rotatably mounted in said housing, an impeller driven by said rotor shaft, a pair of thrust bearings mounted in said housing around said rotor shaft and being of a material which permits a certain degree of abrasion, a pair of thrust washers mounted on said rotor shaft in spaced relation to said thrust bearings, an end plate mounted on said housing adjacent said impeller having means defining with said impeller a fixed orifice, a variable orifice, and a pressure balancing chamber, and an auxiliary thrust bearing releasably secured to one side wall of said variable orifice opposite said impeller for effecting hydraulic thrust balancing and positioning of the impeller, said auxiliary thrust bearing being made of a material which permits a certain degree of abrasion.

2. The mechanism of claim 1 wherein said auxiliary thrust bearing is releasably secured to a lower rim portion of said end plate so as to form one side wall of the variable orifice.

3. The mechanism of claim 1 wherein said auxiliary thrust bearing is L shape and releasably secured to a lower straight portion of said end plate by means of a metal ring so as to provide a rim portion for forming one side wall of the variable orifice.

4. The mechanism of claim 1 wherein said auxiliary thrust bearing is of rectangular form and releasably secured to a bottom portion of said end plate and said shaft is a motor rotor shaft thereby to serve as a journal bearing of the motor rotor shaft while forming one side wall of the variable orifice.

5. The mechanism of claim 1 wherein said impeller has a lower rim, said auxiliary thrust bearing is releasably secured to the side wall surface of said impeller beneath the lower rim thereof to form one side wall of the variable orifice.

6. The mechanism of claim 1 further including means defining an additional fixed orifice, variable orifice and pressure chamber provided between the impeller and the suction inlet connection of said housing, and said suction inlet having a lower corner end, a second auxiliary thrust bearing releasably secured to the lower corner portion of said suction inlet connection thereby forming one side wall of the additional variable orifice.

7. The mechanism of claim 1 wherein the impeller has an inner wall forming the opposite wall of the variable orifice opposite to said auxiliary thrust bearing, said inner wall being a treated surface to impel abrasion of said auxiliary thrust bearing.

8. The mechanism of claim 1 wherein the impeller has an inner wall forming the opposite wall of the variable orifice opposite to said auxiliary thrust bearing, forming the opposite wall, said inner wall being a surface treated thrust ring to impel abrasion of said auxiliary thrust bearing.

References Cited

UNITED STATES PATENTS

| | | | |
|---|---|---|---|
| 1,117,699 | 11/1914 | Pfau | 415—106 |
| 1,210,181 | 12/1916 | Lorenz | 415—106 |
| 3,225,698 | 12/1965 | Spisiak | 417—365 |
| 3,413,925 | 12/1968 | Campolong | 417—365 |
| 3,433,164 | 3/1969 | Neal | 415—423 |
| 3,572,976 | 3/1971 | Sato | 417—369 |

FOREIGN PATENTS

| | | | |
|---|---|---|---|
| 2,802 | 1907 | Great Britain | 415—106 |
| 384,675 | 2/1908 | France | 415—106 |
| 242,320 | 1/1912 | Germany | 415—106 |
| 28,573 | 3/1903 | Switzerland | 415—106 |

HENRY F. RADUAZO, Primary Examiner

U.S. Cl. X.R.

415—106; 417—365